Jan. 24, 1967
D. DANON
3,300,385
METHOD FOR MEASURING OSMOTIC FRAGILITY
OF RED BLOOD CORPUSCLES
Filed April 27, 1962
2 Sheets-Sheet 1
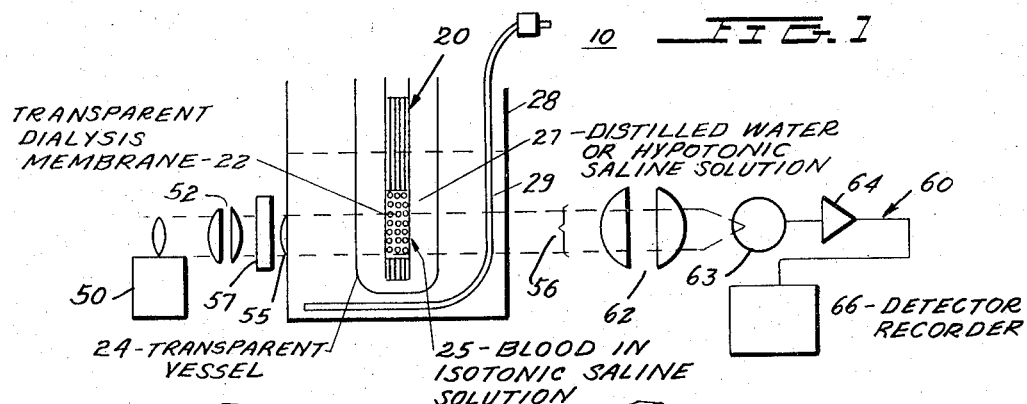
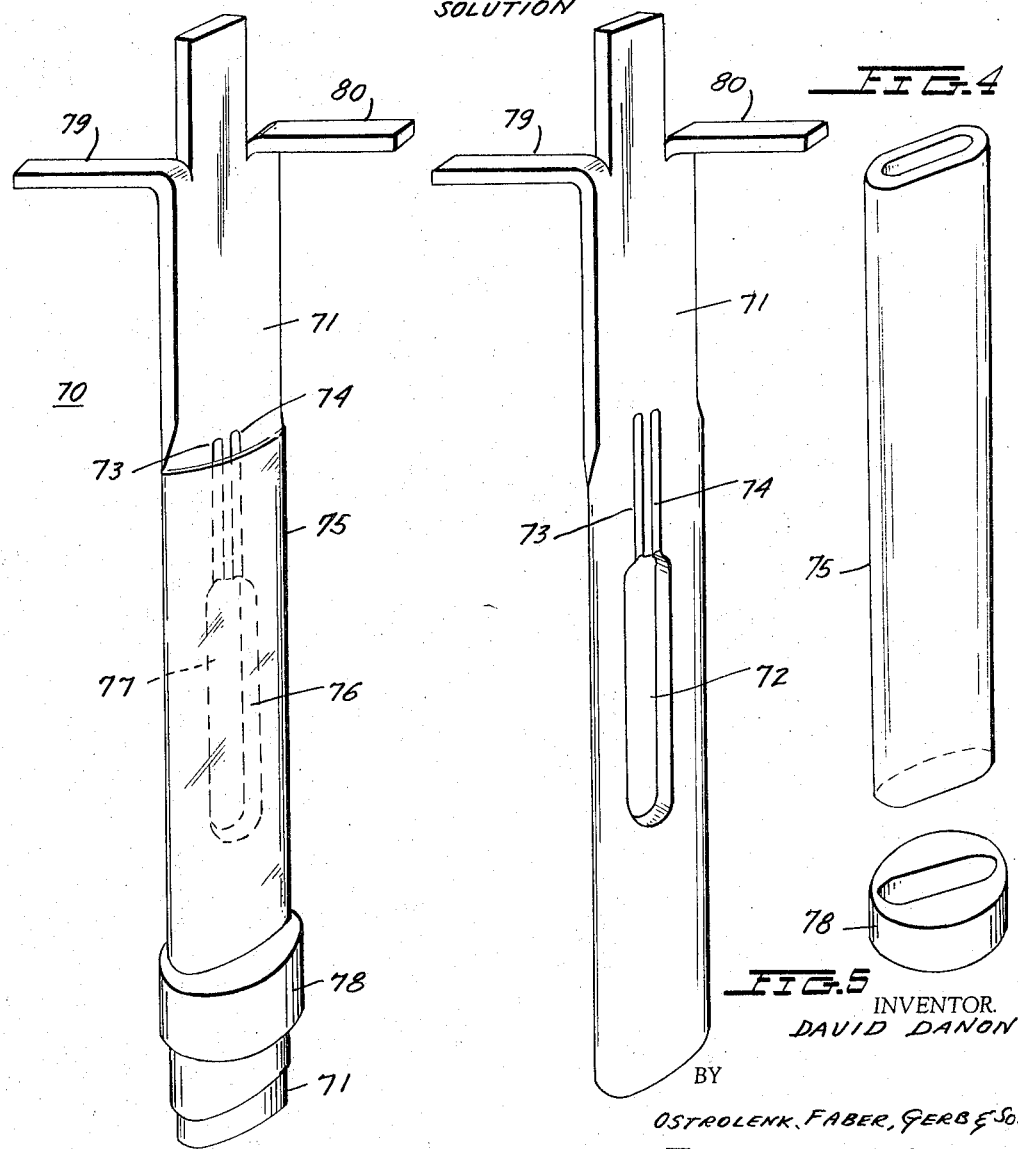
INVENTOR.
DAVID DANON
BY
OSTROLENK, FABER, GERB & SOFFEN
ATTORNEYS

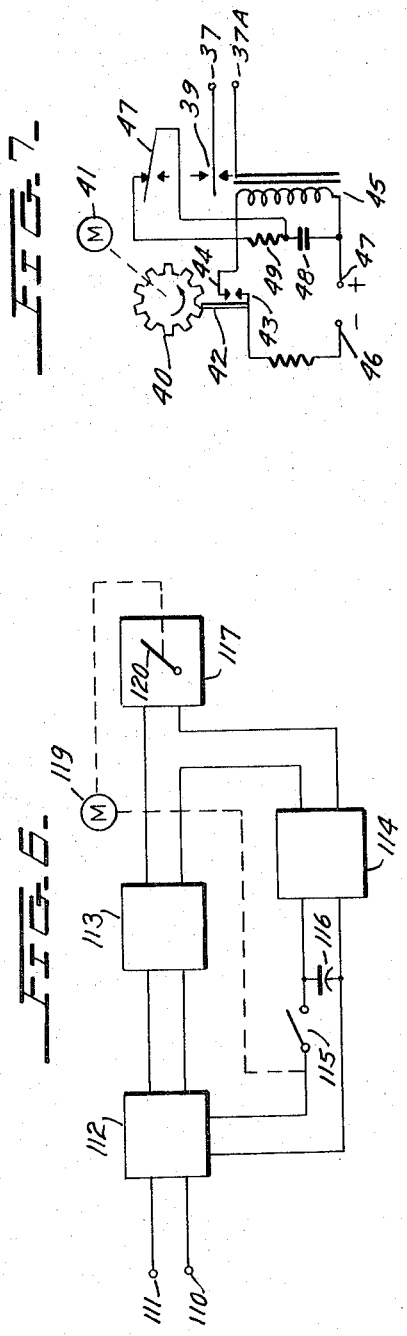

United States Patent Office 3,300,385
Patented Jan. 24, 1967

1

3,300,385
METHOD FOR MEASURING OSMOTIC FRAGILITY
OF RED BLOOD CORPUSCLES
David Danon, Rehovoth, Israel, assignor to Yeda Research and Development Co., Ltd., Rehovoth, Israel, a company of Israel
Filed Apr. 27, 1962, Ser. No. 194,211
Claims priority, application Israel, Aug. 17, 1961, 15,910
7 Claims. (Cl. 167—84.5)

This invention relates to a method of and apparatus for conveniently carrying out an osmotic fragility test of red blood cells.

This test is based on the phenomenon that red blood cells, if initially suspended in an isotonic saline suspending medium, will undergo a change of form and volume and will ultimately release their content of hemoglobin when the concentration of salts of the suspending medium is gradually decreased. This action, termed hemolysis, is the release of the red cell hemoglobin into the suspending medium, and occurs as the result of osmotic pressure developed inside the membrane of the red cell. The rate at which the osmotic pressure develops is a function of the condition of the red cell membrane, and of the concentration of the salts in the suspending medium.

Thus, hemolysis of a specific red blood cell is a function of the condition of the cell membrane, and of the salt concentration of the suspending medium. The condition of the cell membrane and the concentration of the salts in suspending medium are the two variables.

The condition of the cell membrane is itself a function of the age of the cell, the health of the host and other factors not specifically pertinent here.

In the present invention, the matter of importance is the degree of hemolysis or rate at which the hemoglobin leaves the cell due to the osmotic pressure developing inside the cell, with a consequent change of state. This change of the state of the red blood cells results in a change of the light transmission properties of the suspension from which the osmotic fragility of the red blood cells in the given sample can be deduced. That change of light transmission property of the suspension of cells is utilized herein to measure the hemolysis.

The present invention also relates to a novel device, which is illustrated, by way of example, as used with the present method in medical diagnosis and in research. More particularly, the method of the present invention utilizes the novel device to bring about the gradual decrease of the concentration of salts in a liquid sample that contains the cells in suspension confined in said device. A suitable rate-measuring instrument is used in conjunction with the device to indicate the rate of decrease of concentration of the salts and the resulting hemolysis versus time.

The conventional osmotic fragility test in its original form, as well as in most of the variations that followed, is intended to give information on the resistance of the red cell membrane to internal pressure developed by water. (See Wintrobe, Clinical Hematology, 4th ed. 1956, pp. 159 et seq. Lea & Febiger). The water rushes into the cell by diffusion through the red cell membrane driven by the osmotic gradient. Under the increasing pressure the cell membrane may either burst or open numerous pores, but the result will be the same, i.e., the hemoglobin will leave the cell into the suspending medium while the cell membrane, now containing the same concentration of hemoglobin as the external medium, will become a "ghost." The membranes of the cells that are less resistant, or those of cells that are already spherical or close to a spherical form release that hemoglobin earlier. In the experimental conditions this fact is apparent by the less hypotonic external medium necessary to cause release of hemoglobin, or hemolysis.

The classical osmotic fragility test employs a series of test tubes, each containing the same volume of progressively lower concentration, of a salt solution into which the same amount of red blood cells is introduced. After allowing the test tubes to stand for some time, the test tubes are centrifuged to sediment the blood cells that have not hemolysed. The results may be expressed either by indicating the first concentration of salt at which some hemolysis, or release of hemoglobin, could be observed (the supernatant becoming colored by the hemoglobin), or by indicating also the concentration of salt in the solution at which hemolysis is complete. Some investigators add the mean hemolysis, meaning the concentration of salt in which half of the cells have released their hemoglobin. The most complete result gives the amount of hemoglobin released in every one of the test tubes or the volume of cells that remained impermeable to hemoglobin in every one of the test tubes. A quantitative measurement of this information is obtained after centrifugation by measuring the volume of the non-hemolyzed cells, or titrating the amount of hemoglobin released in every one of the test tubes. This titration is generally done by colorimetric methods. The final result of such a test is usually presented in the form of a graph, in which the abscissa represents the salt concentrations, and the ordinates represent the number of hemolyzed cells, or quantity of hemoglobin released. This curve is generally obtained in six, twelve, or eighteen points. More points provide more information, but every additional point means another test tube, another preparation and measurement of hypotonic solution, another measurement of an aliquot of the blood sample, another test tube for centrifugation and reading in the colorimeter, and another point to locate on the graph paper. The number of points is chosen according to personal judgment for the necessary minimum.

By contrast, in accordance with the present invention, a new and simpler method is provided by which the gradual decrease in the salt concentration of the medium surrounding the erythrocytes (red blood cells) is achieved through a dialysis membrane. The fragility curve is automatically traced, by a recording device, and the recorded results are obtained in ten minutes using only about two drops of blood taken for more accuracy in an heparinized pipette of the type used in micro-hematocrit, diluted in 1 ml. of buffered isotonic NaCl solution. This quantity of blood suspension is sufficient for seven or eight tests, each test requiring slightly less than 0.1 ml. of the blood suspension.

The device embodying the invention and employed according to the method of the invention, for the measurement of the osmotic fragility of the red blood cells, comprises a frame having an opening therethrough, with transparent windows parallel and opposite each other closing said opening, and with a dialysis membrane constituting the boundary between the volume defined by said opening and the outside. A preferred embodiment of the device, according to the invention, comprises a receptacle or test container cell for a predetermined quantity of a suspension of red blood cells, the receptacle being bounded by two parallel windows opposite each other, and at least one of said windows being a dialyzing membrane. It is clear, of course, that both windows may be made of transparent dialyzing membranes. The test cell bounded by the dialyzing membrane is filled with a suspension of red blood cells in a solution isotonic with said blood cells, and the test container cell device is introduced into a solution that is hypotonic, or of lower salt concentration, with respect to the blood suspension, or as it is now used, into distilled water. A special device in the frame of the container cell provides the possibility to reproduce the position of the container cell in the vessel with the distilled water. The solution inside the test cell then undergoes a gradual decrease of the concentration of the salts, due to osmosis. The decrease in the salt concentration surrounding the blood cells result in a swelling of the blood cells suspended therein and ultimately in the release of the hemoglobin from said red blood cells. As this hemolysis takes place, the suspension becomes more transparent, and readings of the transmission of light versus time yields a curve from which the osmotic fragility of the red blood cells can be deduced, because with time, due to the diffusion of the salt through the dialysis membrane, the salt concentration becomes progressively lower.

As it is known that the rate of diffusion through the dialysis membrane changes with temperature and as it is known that the conventional fragility test gives different results in different temperatures means for keeping the temperature constant at the desired level is built into the instrument.

One object of this invention is to provide a faster and simpler method, than the present conventional method, of determining the osmotic fragility of red blood cells. This method also yields more information as the recorder marks one point every two seconds which is 300 points during 10 minutes. This is equivalent to 300 test tubes of progressively decreasing salt concentration in the classical osmotic fragility test.

Another object of the invention is to provide a simple method of detecting, and of recording if desired, the rate of hemolysis, and also the maximum rate of such release of hemoglobin in a blood sample.

Another object of the invention is to provide a novel and simple method of observing, recording and analyzing, both visually and mechanically, the reaction of the red blood cell membranes of a given sample of blood to gradually increasing osmotic pressure.

Another object of the invention is to provide a novel method of testing the osmotic fragility of red blood cells under controlled conditions that enable new or unknown properties of the blood cell membrane to be observed and detected and analyzed, due to the proximity (practically continuous variation), of the salt concentration to which the blood cells are subjected and at which a reading is recorded.

Another object is to provide such a method which facilitates obtaining a detailed curve of a fragility test using only one sample of blood and one volume of external medium, and which method avoids the possibility of mistake in measuring the volume of blood samples introduced in every test tube and the volumes of hypotonic solutions in every test tube.

Another object is to enable the direct recording of such a curve using only one or two drops of blood from a finger tip which enables repeated tests even on new born or severely ill persons without being obliged to draw bigger volumes of blood from their veins.

It is clearly possible to construct devices according to the present invention in a great number of ways. The invention is described in more detail in the following description, taken in conjunction with the accompanying drawings, in which:

FIGURE 1 is a schematic functional diagram of the arrangement of the apparatus whereby the method of the invention may be practiced;

FIGURE 2 is a perspective view of a test container cell device according to the invention in assembled state;

FIGURE 3 is a perspective view of the frame of the cell of the device of FIGURE 2;

FIGURE 4 is a perspective view of a dialysis tube, which constitutes the membrane covering the openings of the frame in FIGURE 2; and FIGURE 5 is a perspective view of a spacer adapted to firmly attach the dialysis tube to said frame.

FIGURE 6 schematically illustrates a block diagram of the signal measuring apparatus;

FIGURE 7 is a circuit diagram in more detail of the block diagram of FIGURE 1; and FIGURE 8 is a schematic view illustrating the actuating mechanism and pointer control means for the pointer of a recording instrument.

As shown in FIGURE 1, a system 10, for testing the osmotic fragility of red blood cells, comprises a test container cell 20, a light source 50, and an optical detection and recording assembly 60, shown including a light-collecting lens system 62, a light-responsive or photo-cell 63 and amplifier assembly 64, and an indication or recorder assembly 66.

The test cell 20 is shown schematically as comprising an inner transparent vessel 22. The inner vessel 22 is essentially a tube formed from a dialysis membrane, through which osmosis may readily take place. The outer vessel 24 may be of glass or of other light-transmitting material inert to the solution to be placed in it.

Within this inner vessel is placed a suspension 25 prepared of blood in an isotonic saline solution. Within the outer vessel 24 is placed a distilled water or a hypotonic saline solution 27 with a lower salt concentration than that contained initially in the suspension in the inner tube, or distilled water. The transparent vessel containing the distilled water (or hypotonic salt solution) is placed in another vessel 28 made of transparent material (glass for example) filled with water or a liquid of the same refractive index as the glass. In this vessel there is a thermo element 29 which enables control and regulation of the temperature of the system.

The light source 50 is schematically shown as a candle for purpose of simple generalized illustration. Obviously, any controlled light source may be employed, of any desired strength and form, such as a point source or a linear bar of light, for example. A light-collimating means represented schematically by the optical lens system 52, may serve as a form of control for the shape of the light beam 55.

The input light beam 55 will be directed through the test cell 20, and the output light beam 56 will be collected by a suitable optical system, shown schematically as the lens system 62, to be directed on to the photocell 63. The intensity of the output light beam 56 will be controlled by the conditions in the test cell 20. A filter 57 is placed into the beam of light which reaches the cell. This filter passes light of about 50 millimicrons.

The conditions in the test cell 20 will change with the osmosis that takes place. First, osmosis occurs through the dialysis membrane 22, between the distilled water or hypotonic solution 27 in the outer vessel 24 and the isotonic solution in the membrane defining the inner vessel. The osmotic action through the membrane 22 reduces the concentration of the isotonic solution in the inner vessel 20.

Thereupon, osmosis occurs through the membranes of the red blood cells. The hemoglobin and the salts in the blood cells were initially isotonic with the saline solution which surround the blood cells but the originally isotonic surrounding solution has been rendered hypotonic by the larger volume of distilled water or hypotonic solution 27 in the outer vessel 24 by diffusion through the dialysis membrane 22. The internal pressure developed inside the cells by the water rushing inside causes the hemolysis or loss of the hemoglobin from the red blood cells to the now hypotonic, originally isotonic solution.

The suspension of blood cells in isotonic solution changes its light-transmitting properties from relatively "opaque" or diffusive to relatively transparent as the hemolysis proceeds. Thus, the light-transmitting character, measured by the intensity of the transmitted light beam, as a variable, enables the hemolysis to be detected and measured as a function of that variable, or as a function of time as a parameter, which is practically as a function of salt concentration.

Such light intensity is measured by the light cell 63 and suitably amplified for measurement by the indicator or recorder 66. The recorder 66 may provide a continuous record graph, or a series of points at regular time intervals, from which a graph may be drawn. Such a record is directly responsive to the light intensity, and, therefore to the instantaneous or point value of the hemolysis as a condition.

Further important information may be obtained, however, by showing the rate of hemolysis. Such information can be extremely valuable for the study of the distribution of cells according to their resistance to osmotic pressure and for diagnosis, when correlated with other clinical data relating to the person whose blood is being tested. This kind of "Increment Hemolysis" curve has heretofore been obtained by calculating it from the original curve obtained by the conventional methods.

To obtain such rate of hemolysis, it is merely necessary to derive the first time derivative of the direct reading, from the photo-cell. A system for directly deriving such a first derivative is shown in FIGURES 6 to 8, and explained in connection therewith.

Before proceeding to consideration of FIGURES 6 to 8, reference will be made to FIGURES 2 to 5, to show a novel test cell suitable for simple and convenient testing of a blood sample for its osmotic fragility.

As shown in FIGURES 2 to 5, a test cell 70 according to the invention comprises a frame 71, made of any suitable material, such as plastic, metal or the like, inert towards the suspension of blood cells, having an opening 72 extending therethrough. Preferably there are provided two channels 73 and 74 in frame 71, extending above the volume defined by the opening 72. Over the frame 71 there is stretched a dialysis tube 75, so as to form two stretched dialysis membrane-windows 76 and 77, parallel to and opposite each other. The dialysis tubing used is resilient to a sufficient degree so as to provide tautly stretched windows parallel with each other, which close the inner space of the cell. It may be advantageous to use a spacer 78, as shown in FIGURE 5, which comprises a disc-shaped member, having a fusiform opening of a cross-section corresponding to that of frame 71 and which tightens the closure of the dialysis membrane and which serves also in order to maintain the assembled test cell in the middle of a test tube, if such is used as the container of the distilled water or hypotonic solution.

Two branches are provided on top of the frame (79 and 80), facilitating correct and reproducible positioning of the test container cell inside the vessel of distilled water. These wings can also be used to actuate a microswitch so that recording will start exactly at the second the test container cell has been placed inside the vessel with distilled water.

For effecting the osmotic fragility test, a suspension is prepared of blood in an isotonic solution, and a predetermined quantity of this suspension is introduced into the test cell defined by the inner walls of frame 71 and the window panes of the dialysis membranes 76 and 77. The introduction of the suspension into the cell is advantageously effected by means of a syringe, the bent needle of which is slipped beneath the upper edge of the membrane sleeve 75, and into one of the channels 73 or 74, so that the displaced air can escape through the other channel. The exact volume inside the container cell will be determined by the suspension reaching the end of the channels, at their entry to the container cell. After the introduction of the predetermined volume of the blood suspension into the measuring test cell, the assembly is introduced into another vessel, such as a test tube, filled with distilled water or a solution hypotonic with respect to the blood suspension. The transmission of light through the test cell containing the blood suspension is measured either continuously or at predetermined intervals of time, and appropriately recorded.

As an example, two capillary tubes of the type used in micro-hematocrit filled with blood are diluted in 1 ml. of buffered saline. After a homogeneous suspension is obtained, the suspension is introduced into the test container cell 70. It is important that the recipient between the two dialysis membranes is well filled up to the channels. Air bubbles should be avoided. Cell 70 is then introduced into the test tube containing distilled water, which tube has itself previously been disposed in a thermostat-controlled bath which is in the path of the light beam 55 of the measuring system 10. The temperature in the tube is kept constant. The distilled water will gradually penetrate through the dialysis membrane, and the solution in the cell 70 will gradually become hypotonic. Gradually the blood cells begin to hemolyze after about two minutes, which causes an increasing transparency of the suspension with consequent increased reading by the photoelectric cell 63 and associated metering apparatus.

It is clearly within the scope of the present invention to resort to other designs of such a test cell. Thus it is possible to use a cell having one transparent window of glass or plastic, the other window being a stretched dialysis membrane. It is possible to use sheets of dialysis membrane, which may be attached by any suitable means to the borders of the openings of the frame. It is also possible to use two opposite and parallel transparent windows and to provide at another location an opening covered by a dialysis membrane, which constitutes the boundary between an opening in the cell and the outside containing the distilled water. Also other solutions such as acids or alkali may be used outside the membrane in order to penetrate gradually and hemolyze by acidity or by alkalinity or by lysins or to cause agglutination of the cells, and thus increase their rate of sedimentation which will all result in increasing light transmission.

Reference is now made to FIGURES 6, 7 and 8, showing one form of recorder and system for generating a first derivative of an input signal function.

There are many applications where the significant information contained in an electrical signal can be best shown through the derivative of the signal. By the way of example, in measuring the fragility of red corpuscles, the characteristic is best shown from a measurement of the hemolysis of blood in different saline solutions. One method of making such a measurement is by taking a single sample of the blood and placing this sample into a membrane in a vessel which is immersed in a saline solution. A light beam is then passed through the blood sample with the output of the transmitted light being measured by a conventional photo cell. The amount of light which is transmitted by the sample depends upon how much blood cells have hemolyzed. That is to say, the blood corpuscles will normally diffuse a considerable amount of the light passing through the sample. When hemolysis occurs however, the blood corpuscles that have released their hemoglolin diffuse and absorb the incident light less, whereby more light impinges upon the photo cell. At the end of the process the cell is practically transparent.

By recording the light received by the photo cell and drawing a curve of this as a function of time, which is practically a function of the salt concentration, much diagnostic information can be derived. It has been found that most significant information as for the distribution of blood cells according to their osmotic fragility is obtained from the rate of change of hemolysis of the blood and specifically, the time which is in this case related to the salt concentration at which the maximum rate of change occurs. Thus, if the output signal of the above noted apparatus where light impinges upon a photo cell were applied to circuitry that would take the derivative of the output signal, the most significant information of the greatest rate of change of hemolysis would be represented by a peak signal and thus most easily measured or observed. Also if two peaks are observed it would indicate two populations of cells and the symmetry or asymmetry of every curve will indicate the distribution of the cells according to their osmotic fragility.

It is clear that this is only one of many systems where it would be highly desirable to visually present or record the derivative of an input signal and that a great number of other applications will be readily apparent to those skilled in the art.

The principle of the present invention is highly useful when used in conjunction with a galvanometer type recorder where the galvanometer indicating mechanism records information at only preselected intervals so as to apply a plurality of points on a recording medium which can later be drawn to represent a curve. By way of example, galvanometers are known which have pointers connected to the galvanometer's mechanism wherein the pointer is terminated with a sharp needle. A roll of recording paper passes under the needle at a predetermined rate. Whenever a measurement is to be recorded, a mechanism drives the needle into the paper to make an impression and thereafter permits the needle to be withdrawn quickly. The needle is actuated at predetermined intervals whereby a recording needle impression will be made upon the paper or other recording medium at, for example, every two seconds. Thus, a curve will be drawn from a series of needle impressions on the paper which are spaced at two second intervals.

In accordance with the present invention, the above type mechanism is combined with circuit means whereby an input signal is amplified with the output of the circuit applied to a capacitor. The capacitor then serves as a memory unit in a differentiation circuit whereby the voltage applied to the galvanometer needle is equal to the present instantaneous voltage of the input signal minus the previous recorded voltage as determined by the charge on the capacitor.

Thus, at the end of a first interval of time the capacitor will charge to a particular value which will be recorded by the recording instrument. As the input signal rises, the voltage of the capacitor is held to its original value whereupon, at the end of the next interval, the recorder is actuated by the difference between the instantaneous value of the signal and the previous value as memorized by the capacitor. Thereafter, the capacitor is brought to this second level so as to memorize the instantaneous voltage at the end of the second recording interval so that at the third interval the information applied to the pointer is the voltage difference between the instantaneous value of the signal and its value during the second interval.

Accordingly, the information being recorded is:

$$\frac{V_2 - V_1}{t_2 - t_1}$$

where $V_2$ is the instantaneous voltage at the recording time $t_2$ while $V_1$ is the signal voltage at the previous recording time $t_1$. Since the derivative of the signal can be represented by:

$$\lim_{t_2 - t_1} \frac{V_2 - V_1}{t_2 - t_1}$$

it is clear that by choosing the time interval $t_2 - t_1$ sufficiently short, that an accurate representation of the derivative of the input signal is being recorded in the recording instrument.

With application of the device to the measurement of osmotic or acid or alkaline or hemolyzine fragility of blood corpuscles, it has been found that the interval $t_2 - t_1$ can be of the order of 2 seconds whereby there is a recording by the pointer needle every 2 seconds with sufficient accuracy for presenting diagnostic information. Moreover, the time of greatest significance for diagnostic techniques, which is the time at which the input signal undergoes a maximum rate of change, is clearly presented by the maximum peak signal in the recorded derivative of the input signal.

Referring first to FIGURE 6, there is schematically illustrated a block diagram wherein the input signal is applied to terminals 110 and 111 of amplifier state 112 if such an amplifier stage is necessary. The amplifier stage 112 is then connected to a first amplifier 113 and to a second amplifier 114 through a switch 115. A capacitor 116 is connected across the input terminals of amplifier 114 and is between the switch 115 and amplifier 114. The output of amplifier 113 is connected in series with the output of amplifier 114 and the input of a recorder device 117. Switch 115 is operated between its engaged and disengaged positions according to a timed program from an operating mechanism which could, for example, be actuated by a motor 119. The motor 119 is also connected to the pointer 120 of recorder 117 where recorder 117 is of the type wherein pointer 120 is positioned at any instant in accordance with voltage applied to its input terminals. At appropriate times, determined by the operating means including motor 119, the pointer 120 which cooperates with a recording roll of paper moved under the pointer at a predetermined rate will be depressed to make a recording impression upon the paper and is thereafter released. Such instruments were well known and are within the scope of those skilled in the art and need not be described further herein.

Where the input signal to terminals 110 and 111 is of a slowly varying type and information is desired as to the rate of change of this signal, the system of FIGURE 6 is ideally suited for presenting visual information to the derivative of slowly changing signal.

Thus, for a first recording impression, and assuming that an impression is to be made every two seconds by pointer 120, and assuming that the signal is originally of zero value, the input signal to the recorder is zero so that it records a zero indication. Two seconds later, it will be assumed that the signal has risen slightly. During this two second interval switch 115 is open.

Thus, capacitor 116 is uncharged so that the output of amplifier 114 is still zero. At the end of the two second interval switch 115 is closed, and, simultaneously, the pointer 120 is depressed in the position at which it stood at the instant of the switch closing. At that instant, the output of amplifier 113 is functionally related to the amplitude of the input signal whereupon the output of the series connected amplifiers 113 and 114 is equal to the present instantaneous value of the signal. Thus, this value is recorded.

At the same time and since switch 115 is closed, the capacitor 116 charges to the instantaneous voltage level. Since the pointer 120 is held in position, the increasing output of amplifier 114 has no effect on the impression recorded.

The timing mechanism 119 then releases pointer 120 and opens contact 115. Thus, for the next two-second interval, and prior to the third recording impression, capacitor 116 retains a charge such that the output voltage of amplifier 114 will be equal to the voltage at the time the second impression was made by pointer 120.

At the end of this two-second interval, and to make the third recording impression, the output voltage of amplifier 113 is of course related to the instantaneous value of the input signal. The output of amplifier 114 is at the value of the second and impression made two seconds earlier whereby the voltage applied to the pointer 120 at the end of this two-second interval and immediately prior to the third impression is equal to the voltage change which occurred during this two-second interval.

The motor mechanism 119 then caused pointer 120 to be depressed to record the voltage increase which occurred in this two-second interval. At the same time the motor closes switch 115 so that capacitor 116 has the opportunity to charge up to the value of the instantaneous voltage of amplifier 112. Since pointer 120 is being held at this point, the additional charging of capacitor 116 has no effect of the impression being recorded.

The system then continues to operate in this manner so that a complete curve is drawn. This curve as previously indicated, will be the derivative of the input signal, whereby, for example, the time at which a maximum rate of change at which the input signal occurs can be easily and rapidly located by unskilled personnel by merely observing the point at which the recorded signal has its highest peak.

FIGURES 7 and 8 show one form of electrical circuitry that could satisfy the requirements of the schematically illustrated system of FIGURE 6.

Referring now to FIGURES 7 and 8 and specifically first to FIGURE 7, I have illustrated therein a power supply which serves as a D.-C. source for the system and which includes a rectifier tube 130 which could be of the type E281. The output of the tube 130 is applied to a filter network 131 with the output of the system being applied to a voltage regulating tube 132 which could, for example, be of the type OA2. The regulated output voltage of tube 132 is then further regulated by tube 133 which could be of the type 9061 which is connected between the anode and cathode of a photo-tube 134 which could be of the type 5581.

The photo-tube 134 provides the input signal for the novel differential amplifier and would be used, for example, where a measurement of fragility of blood corpuscles is to be measured by techniques discussed above. It is to be clearly understood, however, that the input signal can be derived from any source which varies slowly. The current produced by the photo cell 134 is first amplified in the first half 134 of a dual triode tube which could be the type ECC81. Tube 135 half is connected in a cathode follower arrangement as shown. The output of the cathode follower is then connected to terminal 136. The output of the cathode follower is also connected to the input of the first half 136 of a second dual triode such as a type ECC81 which is a part of the difference amplifier.

Terminal 136 and terminal 137 are connected in series with output of cathode follower 135 and the capacitor 138 which could, for example, be an eight microfarad capacitor which is the "memorizing" capacitor similar to capacitor 116 of FIGURE 6.

The circuit which includes terminals 136 and 137 is shown in FIGURE 8 where these terminals are connected to relay contacts 139 where contacts 139 are normally open, whereby the output of cathode follower 135 is normally disconnected from capacitor 138. Contacts 139 are equivalent to contact 115 of FIGURE 6.

The contacts 139 are controlled through a circuit shown in FIGURE 8 which includes, for example, a gear tooth wheel 140 which is rotated by a motor 141. The teeth of wheel 140 engage a push rod 142 which is connected to resilient contact 143 which cooperates with a stationary contact 144. Thus, contacts 143 and 144 will be operated between an engaged and disengaged position at a frequency determined by a frequency of rotation wheel 140 and the number of teeth on the wheel while the length of time of engagement and disengagement will be determined by the shape of the teeth. Where a recording impression is to be made every two seconds contacts 143 and 144 would be opened and closed every two seconds.

Contacts 143 and 144 are connected in a closed series circuit as shown which includes relay coil 145 and a D.-C. voltage source connected to terminals 146 and 147 sufficient for operating coil 145. The relay coil 145 is associated with contacts 139 and 147 whereby energization of coil 145 will close normally open contacts 139 and will open the normally closed contacts 147.

Capacitor 148 and resistor 149 are connected in parallel with coil 145 with resistor 149 short circuited by contact 147 when the contacts are closed.

It will be clear that when contacts 143 and 144 are held engaged by wheel 140 their time constant will determine the length of time coil 145 will be sufficiently energized to hold contacts 139 closed.

While contacts 139 are closed terminals 136 and 137 are connected so that the output of cathode follower 135 is applied to capacitor 138. Thus, capacitor 138 will charge up from the voltage which it had at a prior recording interval to the voltage related to to the instantaneous input voltage at the instant of recording with the recording means unaffected during this charging interval as described above with reference to FIGURE 6. The voltage on capacitor 138 serves as a bias for the second half 150 of the triode which has first half 136. Thus, tube half 150 will be driven at the instant a recording impression is to be made with the signal voltage at the prior recording instant while tube half 136 will be driven in accordance with the instantaneous signal voltage at the instant of recording.

The two tube halves 136 and 150 are then connected as illustrated to the recording instrument schematically illustrated as recording instrument 151. The recording instrument 151 therefore receives the different voltage between the present instantaneous voltage and the voltage at the prior recording instant as determined by capacitor 138. Thus tube halves 136 and 150 function as a difference amplifier with the recording instrument connected between the cathodes of the two halves of the tube.

If it is desired to drive recording instrument 151 to faithfully reproduce the actual signal derived from the photosensitive device 134, a switch 125 is provided which disconnects capacitor 138 from the input of tube 150 and connects the second half 153 of the tube including tube half 153 to the input of tube 150. Thus, the system operates as a normal amplifier where recorder 151 receives the amplified input signal to be presented.

The capacitor 138 which is used in the derivative mode of operation for the amplifier is preferably a high quality capacitor whose leakage is a small as possible so that it will not appreciably discharge between successive actuations of the recording device. Thus, care must be taken to avoid resistive loading of the capacitor.

Although I have described preferred embodiments of my novel invention, many variations and modifications will now be obvious to those skilled in the art, and I prefer therefore to be limited not by the specific disclosure herein but only by the appended claims.

I claim:

1. A method for automatically measuring the osmotic fragility of red blood cells, which comprises:
    disposing a first isotonic salt-containing solution having a suspension of red blood cells, and a second hypotonic solution, in a test cell on opposite sides of a dialysis membrane;
    allowing a portion of the salt-containing solution to diffuse through said membrane by osmosis to render said first solution hypotonic with respect to said suspension of red blood cells and effect hemolysis from said cells to said first, now hypotonic, solution; and
    concurrently, at predetermined intervals photoelectrically measuring and recording the light transmissivity of said suspension of red blood cells to determine the osmotic fragility of said cells as a function of time.

2. The method for automatically measuring the osmotic fragility of red blood cells of claim 1, in which the light transmissivity of said suspension is measured by passing light through the suspension simultaneously with the hemolysis thereof, photoelectrically inducing electric currents proportional to the intensities of the light transmitted through said suspension, and recording said currents as a function of time to indicate the instantaneous values of the hemolysis of said cells with respect to time.

3. The method for automatically measuring the osmotic fragility of red blood cells of claim 2, including the further steps of differentiating said currents, and recording the resulting derivatives to indicate the rate of change of the hemolysis of said cells as a function of time.

4. The method for automatically measuring the osmotic fragility of red blood cells of claim 3, including the further step of determining the peak values of said derivatives to indicate the maximum rate(s) of change of the hemolysis as a function of time.

5. A method for automatically measuring and recording the osmotic fragility of red blood cells, which comprises:
   (a) providing a predetermined quantity of a suspension of red blood cells in a first isotonic saline solution;
   (b) providing a second aqueous solution which is hypotonic with respect to said first solution;
   (c) disposing said solutions in a test cell on opposite sides of a dialysis membrane to permit diffusion of the saline solution through said membrane by osmosis to render said first solution hypotonic with respect to the suspension of red blood cells and effect hemolysis from said cells to said first, now hypotonic, solution;
   (d) simultaneously with step (c), passing light through the suspension of red blood cells and photoelectrically inducing electric currents proportional to the intensities of said light; and
   (e) periodically recording said currents to measure the light transmissivity of the suspension of red blood cells during the hemolysis thereof to determine the osmotic fragility of said cells as a function of time.

6. The method for automatically measuring the osmotic fragility of red blood cells of claim 5, including the further steps of differentiating said currents corresponding to the instantaneous values of the hemolysis with respect to time and recording the resulting derivatives to indicate the rate of change of the hemolysis of said cells as a function of time, substantially corresponding to the rate of change of the hemolysis as a function of the salt concentration in said first solution.

7. The method for automatically measuring the osmotic fragility of red blood cells of claim 6, including the further step of determining the peak values of said derivaties to indicate the maximum rate(s) of change of the hemolysis as a function of time.

References Cited by the Examiner
UNITED STATES PATENTS

| | | | |
|---|---|---|---|
| 1,722,435 | 7/1929 | Leiboff | 23—259 |
| 2,359,128 | 9/1944 | Leiboff | 23—259 |
| 2,848,368 | 8/1958 | Witt | 167—84.5 |
| 2,990,335 | 6/1961 | Earle | 167—84.5 |

OTHER REFERENCES

Chem. Abs.: (1) vol. 41, 1947, pp. 4564–5; (2) vol. 46, 1952, p. 2160i; (3) vol. 50, 1956, p. 5807b.

Danon, David J.: Cellular Comp. Physiol., vol. 57, 1961, pp. 111–17.

Danon, David J.: Bull. Res. Council Israel, vol. 6E, 1956, pp. 36–39.

SAM ROSEN, *Primary Examiner.*

JAMES CACCIAPAGLIA, JR., *Examiner.*

ANNA P. FAGELSON, *Assistant Examiner.*